(12) United States Patent
Lores et al.

(10) Patent No.: US 8,662,598 B1
(45) Date of Patent: Mar. 4, 2014

(54) CABLE ACTUATED DUMP TRAILER ASSEMBLY

(76) Inventors: Villen Lores, Tampa, FL (US); Juana Lidia Lores, Tampa, FL (US)

( * ) Notice: Subject to any disclaimer, the term of this patent is extended or adjusted under 35 U.S.C. 154(b) by 0 days.

(21) Appl. No.: 13/477,918

(22) Filed: May 22, 2012

(51) Int. Cl.
*B60P 1/64* (2006.01)
*B60P 1/28* (2006.01)

(52) U.S. Cl.
USPC .......................................... 298/19 V; 414/495

(58) Field of Classification Search
USPC ........ 298/19 V, 1 A, 18, 17.5, 17.6, 1 B, 1 R, 298/11; 414/495
See application file for complete search history.

(56) References Cited

U.S. PATENT DOCUMENTS

| | | | |
|---|---|---|---|
| 1,784,975 A * | 12/1930 | Rosman | 296/35.3 |
| 2,517,933 A | 8/1950 | Schonrock | |
| 2,661,236 A | 12/1953 | Schonrock | |
| 3,406,852 A * | 10/1968 | Winckler | 414/483 |
| 3,724,695 A | 4/1973 | Taylor | |
| 4,704,062 A * | 11/1987 | Hale | 414/494 |
| 4,969,690 A * | 11/1990 | Smith | 298/17 R |
| 5,934,860 A * | 8/1999 | Hotte | 414/500 |
| 6,419,292 B1 | 7/2002 | Calcote et al. | |
| D483,697 S | 12/2003 | Hicks | |
| 2011/0076122 A1 | 3/2011 | Ritson | |

* cited by examiner

*Primary Examiner* — Glenn Dayoan
*Assistant Examiner* — Sunsurraye Westbrook

(57) ABSTRACT

A cable actuated dump trailer assembly includes a vehicle having a frame. A dump trailer is pivotally coupled to the frame. A first jack arm is pivotally coupled to the frame. The first jack arm abuts the dump trailer offset from a rear end of the dump trailer whereby the first jack arm exerts an upward force on the dump trailer pivoting the dump trailer into a dumping position. A winch is coupled to the frame. A first cable is coupled to the winch and the dump trailer. A first pulley is coupled to the first jack arm. A medial portion of the first cable engages the first pulley whereby the first cable urges the first jack arm towards an upright position as the first cable is wound onto the winch whereby the dump trailer is urged into the dumping position.

18 Claims, 4 Drawing Sheets

CABLE ACTUATED DUMP TRAILER ASSEMBLY

BACKGROUND OF THE DISCLOSURE

Field of the Disclosure

The disclosure relates to dump trailer devices and more particularly pertains to a new dump trailer device for moving a dump trailer into a dumping position using cables to reduce potential contamination of the environment associated with leakage in hydraulic systems.

SUMMARY OF THE DISCLOSURE

An embodiment of the disclosure meets the needs presented above by generally comprising a vehicle having a frame. A dump trailer is pivotally coupled to the frame at a trailer pivot point proximate a rear end of the dump trailer. A first end of a first jack arm is pivotally coupled to the frame. A second end of the first jack arm abuts the dump trailer offset from the rear end of the dump trailer. The first jack arm pivots around an arm pivot point whereby the second end of the first jack arm exerts an upward force on the dump trailer pivoting the dump trailer into a dumping position as the first jack arm pivots into an upright position. A winch is coupled to the frame. A first cable has a first end, a second end, and a medial portion extending between the first end of the first cable and the second end of the first cable. The first end of the first cable is coupled to the winch and the second end of the first cable is coupled to the dump trailer. A first pulley is coupled to the first jack arm. The medial portion of the first cable engages the first pulley whereby the first cable urges the first jack arm towards the upright position as the first cable is wound onto the winch.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
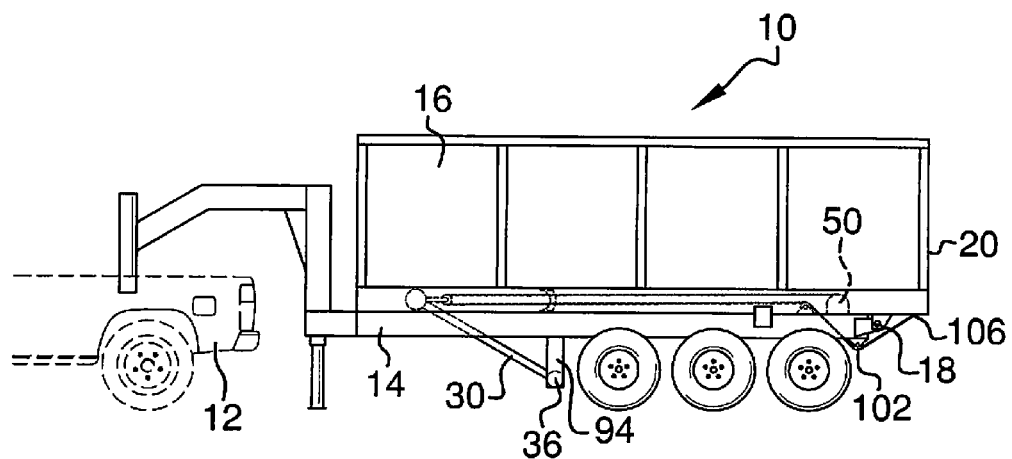
FIG. 1 is a side view of a cable actuated dump trailer assembly according to an embodiment of the disclosure.
Figure 2:
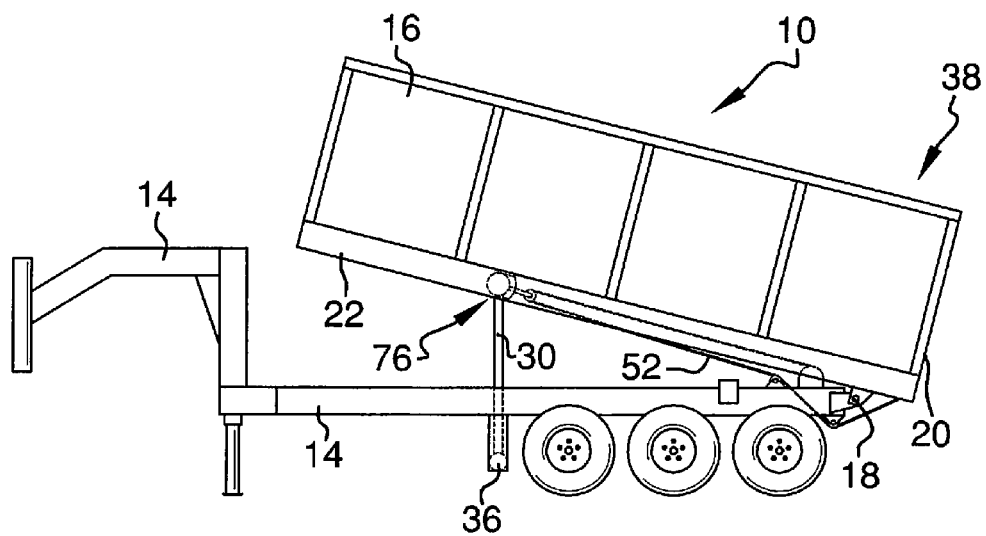
FIG. 2 is a side view of an embodiment of the disclosure.
Figure 3:
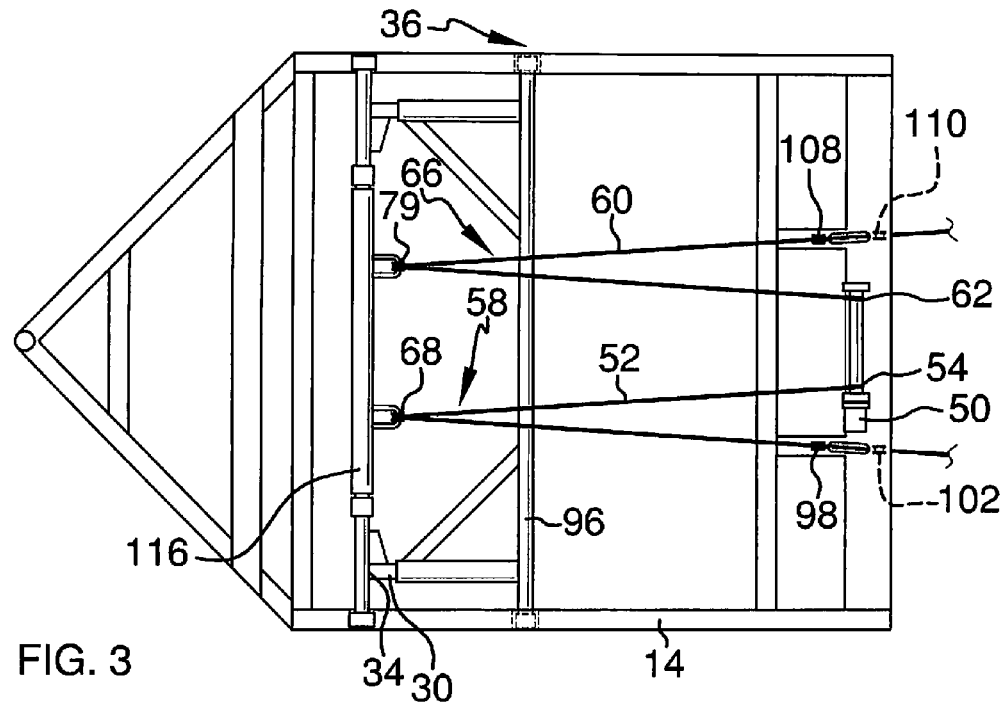
FIG. 3 is a top view of an embodiment of the disclosure.
Figure 4:
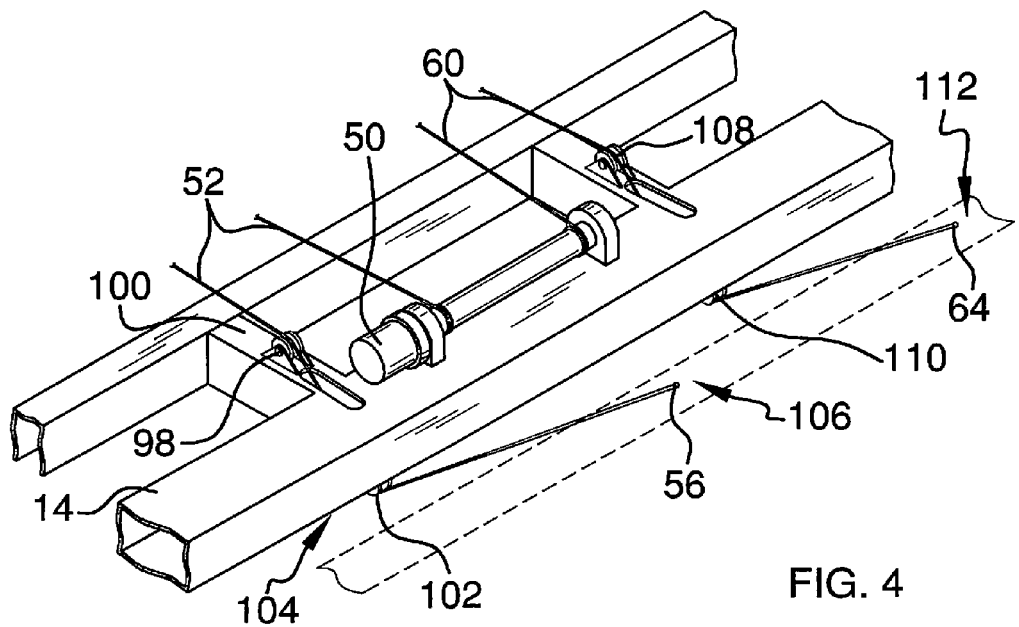
FIG. 4 is a partial top rear side perspective view of an embodiment of the disclosure.
Figure 5:
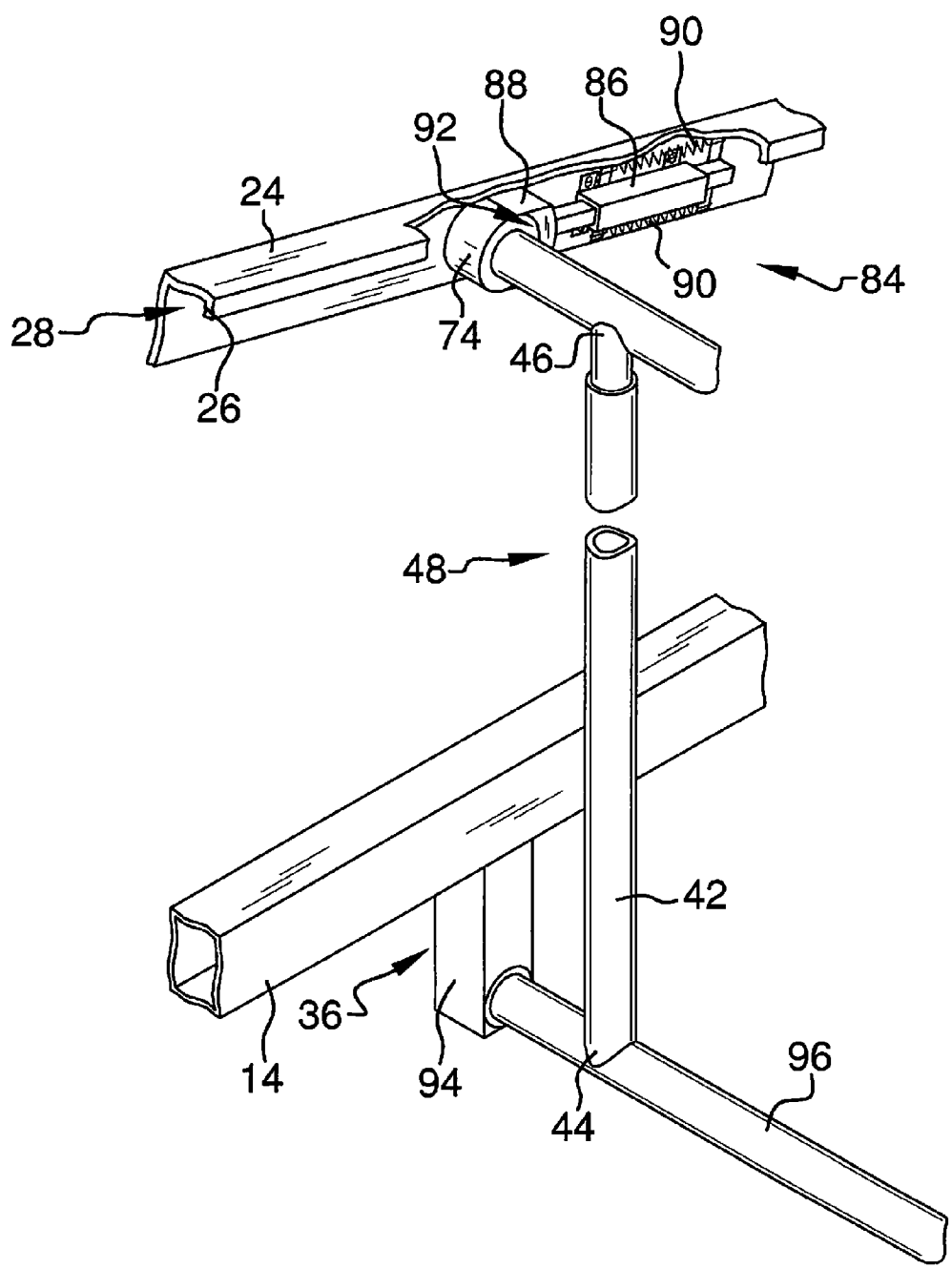
FIG. 5 is a partial top front side perspective view of an embodiment of the disclosure.
Figure 6:
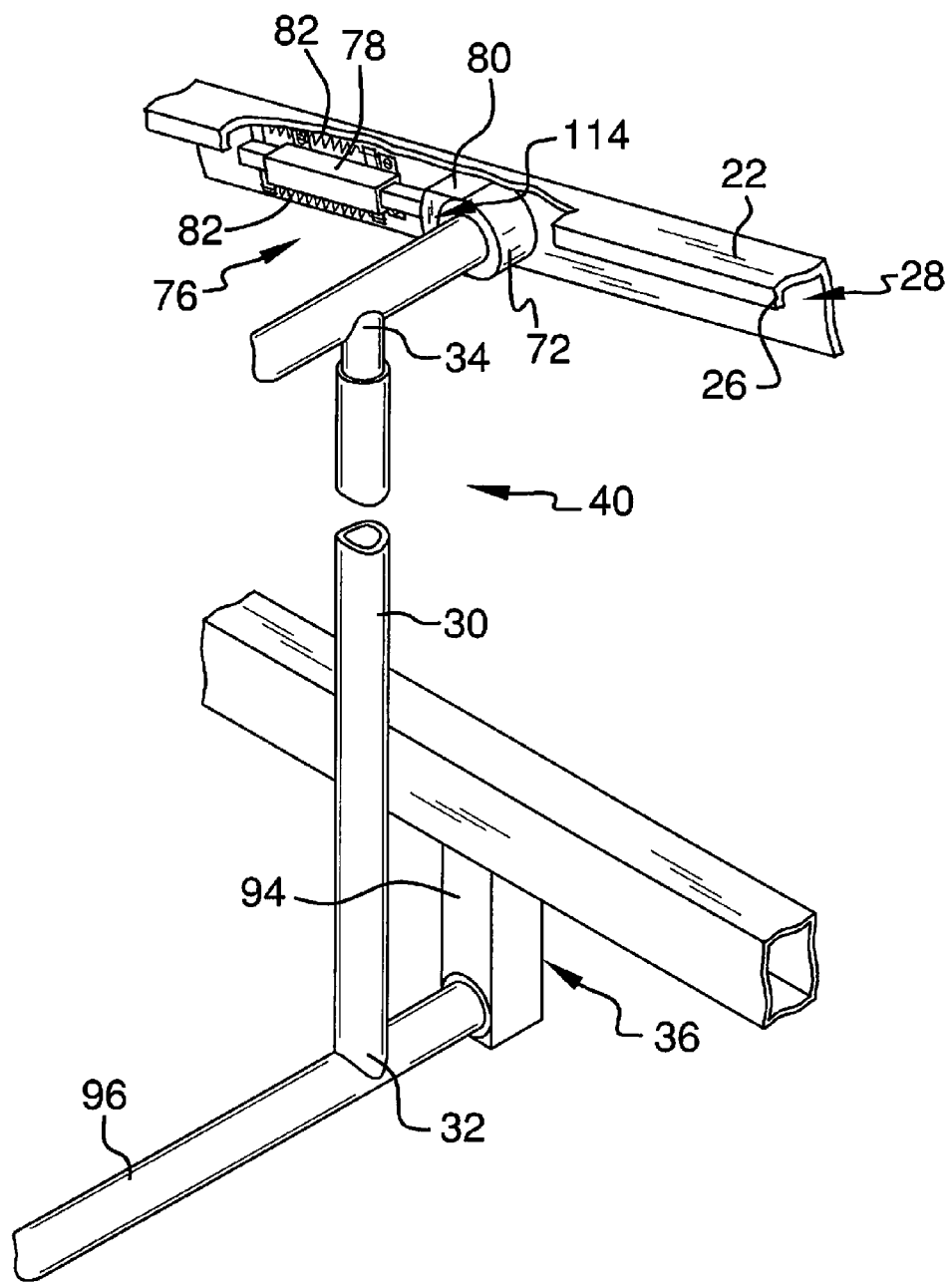
FIG. 6 is a partial top front side perspective view of an embodiment of the disclosure.

With reference now to the drawings, and in particular to FIGS. 1 through 6 thereof, a new dump trailer device embodying the principles and concepts of an embodiment of the disclosure and generally designated by the reference numeral 10 will be described.

As best illustrated in FIGS. 1 through 6, the cable actuated dump trailer assembly 10 generally comprises a frame 14 configured for coupling to a vehicle 12. A dump trailer 16 configured for holding material is pivotally coupled to the frame 14 at a trailer pivot point 18 proximate a rear end 20 of the dump trailer 16. The dump trailer 16 having a first side rail 22 and a second side rail 24. Each of the first side rail 22 and the second side rail 24 has a lip 26 forming a recessed track 28.

A first jack arm 30 has a first end 32 pivotally coupled to the frame 14. A second end 34 of the first jack arm 30 abuts the dump trailer 16 offset from the rear end 20 of the dump trailer 16. The first jack arm 30 pivots around an arm pivot point 36 whereby the second end 34 of the first jack arm 30 exerts an upward force on the dump trailer 16 pivoting the dump trailer 16 into a dumping position 38 as the first jack arm 30 pivots into an upright position 40. The second end 34 of the first jack arm 30 is positioned in the first side rail 22 within the track 28. Similarly, a second jack arm 42 has a first end 44 pivotally coupled to the frame 14. A second end 46 of the second jack arm 42 abuts the dump trailer 16 offset from the rear end 20 of the dump trailer 16. The second jack arm 42 also pivots around the arm pivot point 36 whereby the second end 46 of the second jack arm 42 also exerts an upward force on the dump trailer 16 pivoting the dump trailer 16 into the dumping position 38 as the second jack arm 42 pivots into a raised position 48. The second end 46 of the second jack arm 42 is positioned in the second side rail 24 within the track 28.

A winch 50 is coupled to the frame 14 and may be aligned with a centerline of the frame 14. A first cable 52 has a first end 54, a second end 56, and a medial portion 58 extending between the first end 54 of the first cable 52 and the second end 56 of the first cable 52. The first end 54 of the first cable 52 is coupled to the winch 50. The second end 56 of the first cable 52 is coupled to the dump trailer 16. A second cable 60 has a first end 62, a second end 64, and a medial portion 66 extending between the first end 62 of the second cable 60 and the second end 64 of the second cable 60. The first end 62 of the second cable 60 is coupled to the winch 50. The second end 64 of the second cable 60 is coupled to the dump trailer 16.

A first pulley 68 is coupled to the first jack arm 30. The medial portion 58 of the first cable 52 engages the first pulley 68 whereby the first cable 52 urges the first jack arm 30 towards the upright position 40 as the first cable 52 is wound onto the winch 50. A second pulley 70 is coupled to the second jack arm 42. The medial portion 66 of the second cable 60 engages the second pulley 70 whereby the second cable 60 urges the second jack arm 42 towards the raised position 48 as the second cable 60 is wound onto the winch 50. The first pulley 68 and second pulley 70 may each be coupled to a crossbar 116 extending between the first jack arm 30 and the second jack arm 42.

An annular first bearing 72 is coupled to the second end 34 of the first jack arm 30 offset by the crossbar 116 and an annular second bearing 74 is coupled to the second end 46 of the second jack arm 42 offset by the crossbar 116. A first jack stop assembly 76 is coupled to the first side rail 22. The first jack stop assembly 76 inhibits the first jack arm 30 from rotating further when the first jack arm 30 pivots into the upright position 40. The first jack stop assembly 76 includes a fixed tube 78 coupled to and positioned in the first side rail 22 within the track 28. The first jack stop assembly 76 also has a bearing block 80 slidably inserted into the fixed tube 78 and at least one biasing member 82 coupled between the fixed block 78 and the bearing block 80 to bias the bearing block 80 to extend forwardly from the fixed tube 78. A second jack stop assembly 84 is coupled to the second side rail 24 within the track 28. The second jack stop assembly 84 inhibits the second jack arm 42 from rotating further when the second jack arm 42 pivots into the raised position 48. The second jack stop assembly 84 includes a fixed tube 86 coupled to and positioned in the second side rail 24. The second jack stop assembly 84 also has a bearing block 88 slidably inserted into the fixed tube 86 and at least one biasing member 90 coupled between the fixed tube 86 of the second jack stop assembly 84 and the bearing block 88 of the second jack stop assembly 84 biasing the bearing block 88 forwardly from the fixed tube 86.

A forward surface 114 of the bearing block 80 of the first jack stop assembly 76 is curved to receive the first bearing 72 coupled to the second end 34 of the first jack arm 30. A forward surface 92 of the bearing block 88 of the second jack stop assembly 84 is curved to receive the second bearing 74 coupled to the second end 46 of the second jack arm 42.

A pair of vertical supports 94 is coupled to and extends downwardly from the frame 14. An axle 96 is coupled to and extends between the supports 94. The first end 32 of the first jack arm 30 is coupled to the axle 96 whereby the first jack arm 30 is pivotally coupled to the frame 14 and pivots relative to the frame 14. The first end 44 of the second jack arm 42 is similarly coupled to the axle 96 whereby the second jack arm 42 is also pivotally coupled to the frame 14 and pivots relative to the frame 14.

A first upper roller 98 is coupled to a top side 100 of the frame 14. A first lower roller 102 is coupled to a bottom side 104 of the frame 14. The first cable 52 is threaded through the first upper roller 98 and the first lower roller 102. The first upper roller 98 is positioned between the winch 50 and the first lower roller 102. The first lower roller 102 is positioned between the first upper roller 98 and the second end 56 of the first cable 52. The second end 56 of the first cable 52 is coupled to the dump trailer 16 at a first trailer connection point 106. The first trailer connection point 106 is positioned between the trailer pivot point 18 and the rear end 20 of the dump trailer 16. Thus, the second end 56 of the first cable 52 exerts a downward force on the dump trailer 16 urging the dump trailer 16 into the dumping position 38 as the first cable 52 is wound onto the winch 50.

A second upper roller 108 is coupled to the top side 100 of the frame 14. A second lower roller 110 is coupled to the bottom side 104 of the frame 14. The second cable 60 is threaded through the second upper roller 108 and the second lower roller 110. The second upper roller 108 is positioned between the winch 50 and the second lower roller 110. The second lower roller 110 is positioned between the second upper roller 108 and the second end 64 of the second cable 60. The second end 64 of the second cable 60 is coupled to the dump trailer 16 at a second trailer connection point 112. The second trailer connection point 112 is positioned between the trailer pivot point 18 and the rear end 20 of the dump trailer 16. Thus, the second end 64 of the second cable 60 also exerts a downward force on the dump trailer 16 urging the dump trailer 16 into the dumping position 38 as the second cable 60 is wound onto the winch 50.

In use, the winch 50 is activated to wind both the first cable 52 and the second cable 60 onto the winch 50. As described above, the winding provides upward force on the dump trailer 16 and downward force on the dump trailer 16 on opposite side of the trailer pivot point 18 to urge the dump trailer 16 into the dumping position 38. The winch 50 may be activated remotely from within a cabin of the vehicle 12 or utilizing a switch conveniently positioned for the intended purpose. A single cable may be utilized but the first cable 52 and second cable 60 are provided substantially in mirror image to provide stable movement and prevention of twisting on the assembly 10 during use.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A dump trailer assembly comprising:
a frame configured for coupling to a vehicle;
a dump trailer pivotally coupled to said frame at a trailer pivot point proximate a rear end of said dump trailer;
a first jack arm having a first end pivotally coupled to said frame, a second end of said first jack arm abutting said dump trailer offset from said rear end of said dump trailer, said first jack arm pivoting around an arm pivot point whereby said second end of said first jack arm exerts an upward force on said dump trailer pivoting said dump trailer into a dumping position as said first jack arm pivots into an upright position;
a winch coupled to said frame proximate said rear end of said dump trailer;
a first cable having a first end, a second end, and a medial portion extending between said first end of said first cable and said second end of said first cable, said first end of said first cable being coupled to said winch, said second end of said first cable being coupled to said dump trailer; and
a first pulley coupled to said first jack arm, said medial portion of said first cable engaging said first pulley whereby said first cable urges said first jack arm towards said upright position as said first cable is wound onto said winch.

2. The assembly of claim 1, further including said dump trailer having a first side rail, said second end of said first jack arm being positioned in said first side rail.

3. The assembly of claim 2, further including an annular first bearing coupled to said second end of said first jack arm.

4. The assembly of claim 3, further including a first jack stop assembly coupled to said first side rail, said first jack stop assembly inhibiting said first jack arm from rotating upon said first jack arm pivoting into said upright position.

5. The assembly of claim 4, further including said first jack stop assembly including a fixed tube coupled to and positioned in said first side rail.

6. The assembly of claim 5, further including said first jack stop assembly having a bearing block slidably inserted into said fixed tube and a biasing member coupled between said fixed tube and said bearing block whereby said bearing block is biased to extend forwardly from said fixed tube.

7. The assembly of claim 6, further including a forward surface of said bearing block of said first jack stop assembly being curved to receive said first bearing coupled to said second end of said first jack arm.

8. The assembly of claim 1, further comprising:
a pair of supports coupled to and extending downwardly from said frame; and
an axle coupled to and extending between said supports.

9. The assembly of claim 8, further including said first end of said first jack arm being coupled to said axle whereby said first jack arm pivots relative to said frame.

10. The assembly of claim 1, further comprising:
a first upper roller coupled to a top side of said frame;
a first lower roller coupled to a bottom side of said frame; and
said first cable being threaded through said first upper roller and said first lower roller.

11. The assembly of claim 10, further including said second end of said first cable being coupled to said dump trailer at a first trailer connection point, said first trailer connection point being positioned between said trailer pivot point and said rear end of said dump trailer whereby said second end of said first cable exerts a downward force on said dump trailer urging said dump trailer into said dumping position as said first cable is wound onto said winch.

12. The assembly of claim 1, further comprising:
a second jack arm having a first end pivotally coupled to said frame, a second end of said second jack arm abutting said dump trailer offset from said rear end of said dump trailer, said second jack arm pivoting around said arm pivot point whereby said second end of said second jack arm exerts an upward force on said dump trailer pivoting said dump trailer into said dumping position as said second jack arm pivots into a raised position;
a second cable having a first end, a second end, and a medial portion extending between said first end of said second cable and said second end of said second cable, said first end of said second cable being coupled to said winch, said second end of said second cable being coupled to said dump trailer; and
a second pulley coupled to said second jack arm, said medial portion of said second cable engaging said second pulley whereby said second cable urges said second jack arm towards said raised position as said second cable is wound onto said winch.

13. The assembly of claim 12, further comprising:
said dump trailer having a second side rail, said second end of said second jack arm being positioned in said second side rail;
an annular second bearing coupled to said second end of said second jack arm;
a second jack stop assembly coupled to said second side rail, said second jack stop assembly inhibiting said second jack arm from rotating upon said second jack arm pivoting into said raised position, said second jack stop assembly including a fixed tube coupled to and positioned in said second side rail, said second jack stop assembly having a bearing block slidably inserted into said fixed tube of said second jack stop assembly and a biasing member coupled between said fixed tube of said second jack stop and said bearing block of said second jack stop assembly whereby said bearing block of said second jack stop assembly is biased to extend forwardly from said fixed tube of said second jack stop assembly; and
a forward surface of said bearing block of said second jack stop assembly being curved to receive said second bearing coupled to said second end of said second jack arm.

14. The assembly of claim 13, further comprising:
a pair of supports coupled to and extending downwardly from said frame; and
an axle coupled to and extending between said supports.

15. The assembly of claim 14, further including said first end of said second jack arm being coupled to said axle whereby said second jack arm pivots relative to said frame.

16. The assembly of claim 12, further comprising:
a second upper roller coupled to a top side of said frame;
a second lower roller coupled to a bottom side of said frame; and
said second cable being threaded through said second upper roller and said second lower roller.

17. The assembly of claim 16, further including said second end of said second cable being coupled to said dump trailer at a second trailer connection point, said second trailer connection point being positioned between said trailer pivot point and said rear end of said dump trailer whereby said second end of said second cable exerts a downward force on said dump trailer urging said dump trailer into said dumping position as said second cable is wound onto said winch.

18. A dump trailer assembly comprising:
a frame configured for coupling to a vehicle;
a dump trailer pivotally coupled to said frame at a trailer pivot point proximate a rear end of said dump trailer, said dump trailer having a first side rail and a second side rail;
a first jack arm having a first end pivotally coupled to said frame, a second end of said first jack arm abutting said dump trailer offset from said rear end of said dump trailer, said first jack arm pivoting around an arm pivot point whereby said second end of said first jack arm exerts an upward force on said dump trailer pivoting said dump trailer into a dumping position as said first jack arm pivots into an upright position, said second end of said first jack arm being positioned in said first side rail;
a second jack arm having a first end pivotally coupled to said frame, a second end of said second jack arm abutting said dump trailer offset from said rear end of said dump trailer, said second jack arm pivoting around said arm pivot point whereby said second end of said second jack arm exerts an upward force on said dump trailer pivoting said dump trailer into said dumping position as said second jack arm pivots into a raised position, said second end of said second jack arm being positioned in said second side rail;
a winch coupled to said frame;
a first cable having a first end, a second end, and a medial portion extending between said first end of said first cable and said second end of said first cable, said first end of said first cable being coupled to said winch, said second end of said first cable being coupled to said dump trailer;
a second cable having a first end, a second end, and a medial portion extending between said first end of said second cable and said second end of said second cable, said first end of said second cable being coupled to said winch, said second end of said second cable being coupled to said dump trailer;
a first pulley coupled to said first jack arm, said medial portion of said first cable engaging said first pulley whereby said first cable urges said first jack arm towards said upright position as said first cable is wound onto said winch;
a second pulley coupled to said second jack arm, said medial portion of said second cable engaging said second pulley whereby said second cable urges said second jack arm towards said raised position as said second cable is wound onto said winch;

an annular first bearing coupled to said second end of said first jack arm;

an annular second bearing coupled to said second end of said second jack arm;

a first jack stop assembly coupled to said first side rail, said first jack stop assembly inhibiting said first jack arm from rotating upon said first jack arm pivoting into said upright position, said first jack stop assembly including a fixed tube coupled to and positioned in said first side rail, said first jack stop assembly having a bearing block slidably inserted into said fixed tube of said first jack stop assembly and a biasing member coupled between said fixed tube of said first jack stop assembly and said bearing block of said first jack stop assembly whereby said bearing block of said first jack stop assembly is biased to extend forwardly from said fixed tube of said first jack stop assembly;

a second jack stop assembly coupled to said second side rail, said second jack stop assembly inhibiting said second jack arm from rotating upon said second jack arm pivoting into said raised position, said second jack stop assembly including a fixed tube coupled to and positioned in said second side rail, said second jack stop assembly having a bearing block slidably inserted into said fixed tube of said second jack stop assembly and a biasing member coupled between said fixed tube of said second jack stop assembly and said bearing block of said second jack stop assembly whereby said bearing block of said second jack stop assembly is biased to extend forwardly from said fixed tube of said second jack stop assembly;

a forward surface of said bearing block of said first jack stop assembly being curved to receive said first bearing coupled to said second end of said first jack arm;

a forward surface of said bearing block of said second jack stop assembly being curved to receive said second bearing coupled to said second end of said second jack arm;

a pair of supports coupled to and extending downwardly from said frame;

an axle coupled to and extending between said supports, said first end of said first jack arm being coupled to said axle whereby said first jack arm pivots relative to said frame, said first end of said second jack arm being coupled to said axle whereby said second jack arm pivots relative to said frame;

a first upper roller coupled to a top side of said frame;

a first lower roller coupled to a bottom side of said frame, said first cable being threaded through said first upper roller and said first lower roller, said second end of said first cable being coupled to said dump trailer at a first trailer connection point, said first trailer connection point being positioned between said trailer pivot point and said rear end of said dump trailer whereby said second end of said first cable exerts a downward force on said dump trailer urging said dump trailer into said dumping position as said first cable is wound onto said winch;

a second upper roller coupled to a top side of said frame; and a second lower roller coupled to a bottom side of said frame, said second cable being threaded through said second upper roller and said second lower roller, said second end of said second cable being coupled to said dump trailer at a second trailer connection point, said second trailer connection point being positioned between said trailer pivot point and said rear end of said dump trailer whereby said second end of said second cable exerts a downward force on said dump trailer urging said dump trailer into said dumping position as said second cable is wound onto said winch.

* * * * *